Feb. 25, 1936.  J. C. OLSEN  2,031,977
TOOL FOR PREPARING BELT ENDS
Filed Feb. 21, 1935    2 Sheets-Sheet 1
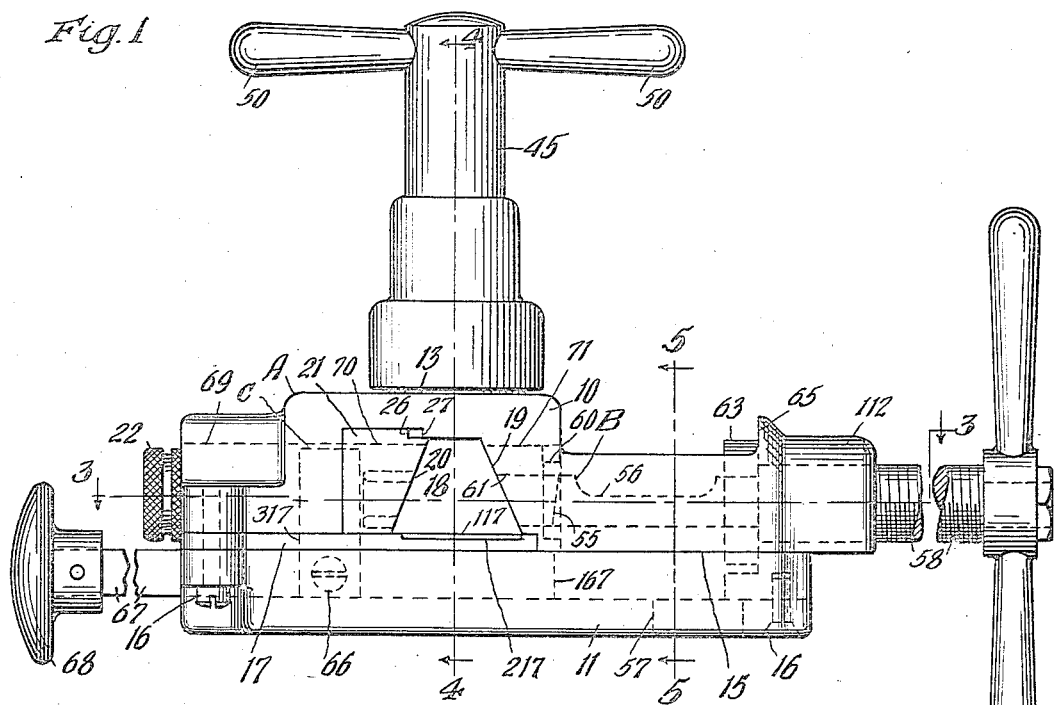
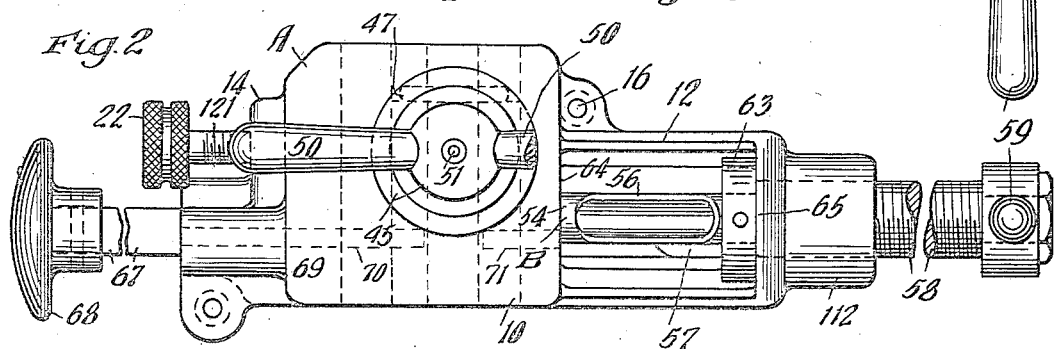
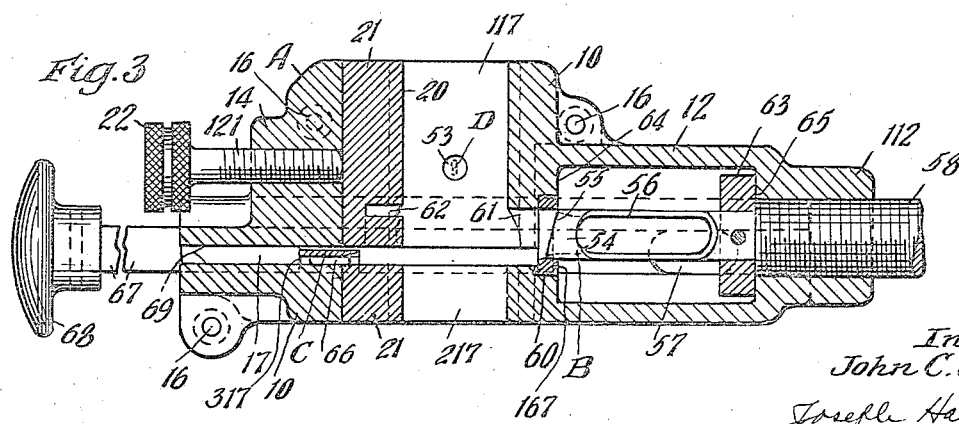
Inventor
John C. Olsen
By Joseph Harris
his Atty.

Feb. 25, 1936.  J. C. OLSEN  2,031,977
TOOL FOR PREPARING BELT ENDS
Filed Feb. 21, 1935  2 Sheets-Sheet 2
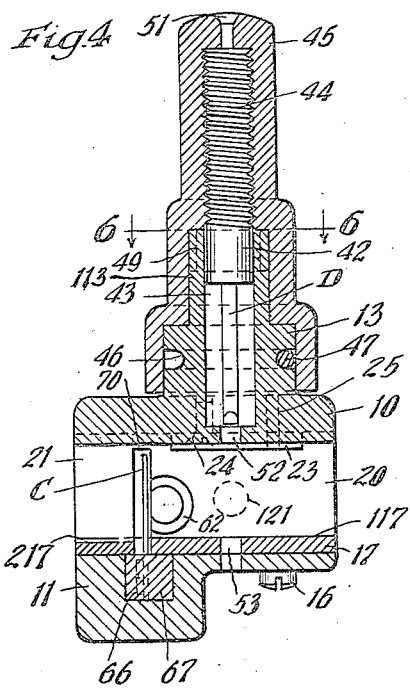
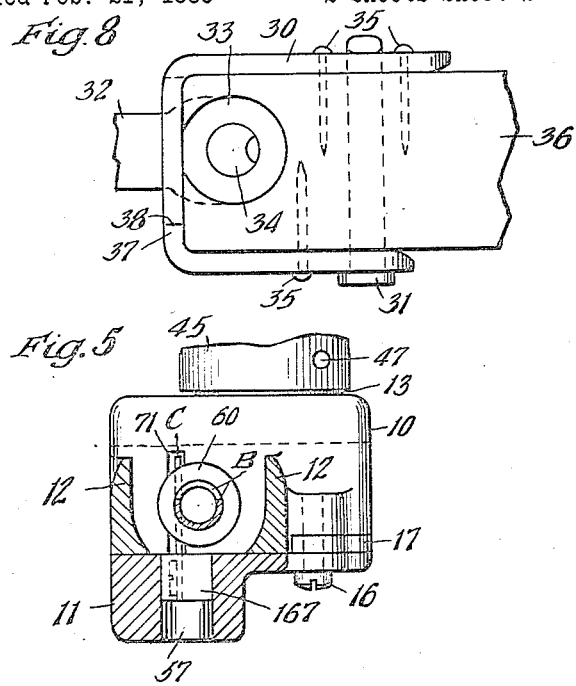
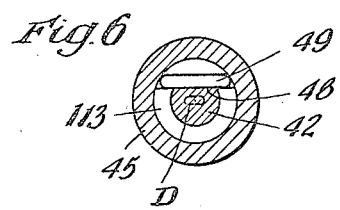
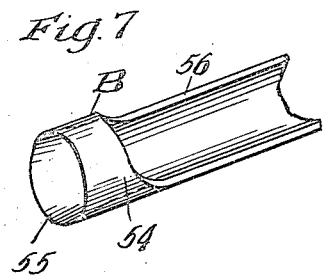
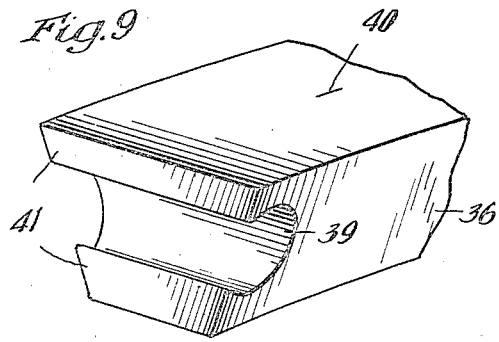
Inventor
John C. Olsen
By Joseph Harris
his Atty.

Patented Feb. 25, 1936

2,031,977

UNITED STATES PATENT OFFICE 2,031,977

TOOL FOR PREPARING BELT ENDS

John C. Olsen, Chicago, Ill., assignor to Flexible Steel Lacing Company, Chicago, Ill., a corporation of Illinois Application February 21, 1935, Serial No. 7,486

10 Claims. (Cl. 164—15)

This invention relates to improvements in tool for preparing belt ends, and more specifically, but not exclusively, ends of V-belts, to adapt the same for use of belt fasteners of the type shown in Patent No. 1,989,147 granted January 29, 1935.

In said patent is illustrated a type of flexible fastener particularly designed for V-belts, which has proven highly successful in service. Experience with said fastener has shown, however, that, on account of the relatively small quantity of material in the belt available for attachment, great care is necessary in properly and accurately preparing the ends of the V-belt for the reception and attachment of the fasteners. One object of the present invention, therefore, is to provide a precision device for preparing the ends of V-belts for the proper and accurate attachment of fasteners of the character indicated.

Another object of the invention is to provide a device which will bore, trim and punch V-belt ends in such manner that the bore or recess, trimmed or squared end, and the punched hole, will bear a predetermined relationship not only with respect to each other but also with respect to the end of the belt which is to receive the fastener.

Other objects of the invention are: To provide a device of the character indicated wherein, during the manipulation of the several operating parts, injury to any one of the tools by improper operation is eliminated; wherein all of the parts may be easily actuated; and wherein the device may be made portable, of simple construction and relatively inexpensive to manufacture and maintain.

Other objects of the invention will more clearly appear from the description and claims hereinafter following.

In the drawings forming a part of this specification, Figure 1 is a front elevational view of a device embodying the invention. Figure 2 is a top plan view of the device shown in Figure 1, part of one of the handles being broken off to better disclose certain of the parts. Figure 3 is a horizontal sectional view corresponding substantially to the line 3—3 of Figure 1. Figure 4 is a vertical sectional view corresponding to the line 4—4 of Figure 1. Figure 5 is a vertical sectional view corresponding to the line 5—5 of Figure 1. Figure 6 is a horizontal detailed sectional view corresponding to the line 6—6 of Figure 4. Figure 7 is a detailed perspective of the improved boring bit employed in the device. Figure 8 is an elevational view of a V-belt and fastener in position thereon, illustrating the general assembly and similar to that disclosed in said Patent 1,989,147. And Figure 9 is a detailed perspective showing the end of a V-belt prepared in accordance with the present invention.

In said drawings, the improved device is shown as comprising what may be termed a holder or main block A; a boring device B; a cutting device C; and a punching device D.

The holder A preferably comprises an upper main casting 10 and a lower casting 11. The upper casting or member 10 is formed with a laterally extended hollow section 12 at one side; an integral upstanding bearing section 13 and another laterally extended section 14 on the opposite side of that of section 12. The two castings 10 and 11 have a horizontal parting line 15, and the two parts are securely but detachably held together in assembly relation by suitable machine screws 16—16. Interposed between the members 10 and 11 and conforming in outline thereto is a plate 17 which forms a seat for the belt while being treated and also performs certain other functions hereinafter described. The holder A is provided, substantially centrally thereof, with a horizontally extending recess 18 which conforms to the cross-section of the particular size of V-belt which is to be prepared for the reception of the fastener. Said recess 18 is defined on the bottom by a portion of the upper surface of said plate 17, as indicated at 117, the surface of said plate, outwardly of the line of cut of the knife C, being depressed slightly, as indicated at 217. One side of said recess, the side adjacent the boring bit, is defined by an integral upwardly and inwardly inclined fixed wall 19 as best shown in Figure 1. The opposite inclined side of the recess 18 is defined by an inclined surface 20 formed on a horizontally adjustable clamping and backing block 21. The latter is adapted to be forced inwardly toward the fixed wall 19, by means of an adjusting screw 121 threaded in the off-set section 14 and having a knurled head 22. Said block 21 is guided in its path of travel preferably by means of a plate 23 secured to the main holder section 10 in the upper portion of the recess thereof as by the machine screw 24 and friction pin 25, the block 21 being recessed in its upper face to conform to said plate 23. The block 21 is limited in its inward movement by the opposed cooperating shoulders 26 and 27 formed on it and the main holder section 10, as best shown in Figure 1, these limiting shoulders being provided to prevent overcompression or distortion of the belt while clamped, it being understood that said belts are generally comprised of fabric and rubber which is more or less compressible and might be unduly distorted if compressed too severely.

After the belt end is clamped in position by the means just described, the belt end then has performed on it three operations so as to produce the formation of belt end as indicated in Figures 8 and 9. Referring to Figure 8, which illustrates the belt having a fastener of the type shown in said Patent No. 1,989,147, applied thereto, said fastener comprises, broadly, a bail 30; a securing pin 31; a link 32; bearing bushings 33; a rocker pin 34; and supplemental attaching brads for the belt, 35—35. The upper and lower arms of the bail 30 embrace the outer end inner surfaces of the belt end 36, and the bight 37 of the bail contacts the end of the belt. The pin 31, as illustrated in said patent, is extended through both arms of the bail and is of preferably flattened cross section with the longer dimension extending parallel to the length of the belt. The link 32 has its end entered through a suitable recess 38 in the bight of the bail and said link has engagement with the rocker pin 34, the ends of the latter in turn being seated in the bearing bushings 33. In preparing the belt end, it is therefore necessary to remove a cylindrical section or core from the belt transversely thereof, as indicated at 39 in Figure 9, for the reception and proper location of the bearing bushing 33 and associated rocker pin 34. Likewise, it is desirable to punch a fine slit radially through the belt at the proper location, as indicated at 40 in Figure 9, to facilitate the entrance of the securing pin 31 and without disrupting the material of which the belt is comprised. It is also essential that the bore 39 of the belt be accurately located not only with respect to the inner and outer faces of the belt but also with respect to the flat end 41 thereof against which seats the bight 37 of the bail, and hence said face 41 must be cut or trimmed accurately with reference to the axis of the bore 39 as well as with reference to location of the pin 31.

After the belt end is clamped in the tool, the slit 40 is preferably first punched by the punch D. The latter as best shown in Figures 4 and 6, is made relatively thin and more or less in the form of a fine chisel with the longer dimension thereof extending parallel to the belt so as to produce the slit 40 in the direction indicated best in Figure 9. The punch D is detachably but rigidly secured to the lower end of a screw 42 which moves up and down in a vertical cylindrical recess 43 provided in the upstanding bearing section 13. The threaded section 44 proper of the screw member 42 cooperates with a nut sleeve 45 which is rotatably mounted on the bearing section 13, as shown in Figures 1 and 2. To provide for the rotative movement while at the same time preventing its accidental removal, the bearing section 13 is provided with an annular slot 46 and in which engages a pin 47 carried by the sleeve nut so as to provide a swivel connection. In order to prevent rotation of the punch D during its up and down movements, the screw 42, throughout its length is provided with a flattened side 48, as best shown in Figure 6, with which cooperates a flat plate 49 mounted in a suitable slot in the upper reduced diameter section 113 of the bearing section 13. The sleeve nut 45 is preferably provided with short handle bars 50 to easily effect rotation thereof and may also have an oil feed hole 51 at the top thereof.

Upon rotation of the sleeve nut 45 in the proper direction, the punch D will be fed downwardly, as will be apparent, the same passing down through a suitable opening 52 in the holder A, thence through the belt and partially into the clearance hole 53 in the bottom of the holder A, as shown in Figure 4. In the use of the device, the punch is preferably first operated and left in its position extending through the belt, so as to further minimize any tendency of the belt to shift during the subsequent boring and cutting operations. As will be apparent, upon removing the pin 47, the sleeve nut 45 may be removed and thereafter the punch and its screw removed and a new punch substituted or the same sharpened.

Preferably, the next operation is that of boring the belt transversely by the boring bit B. The latter, as best shown in Figures 2, 3 and 7, preferably consists of a hollow tubular section 54 with a cutting edge 55 which is formed on a plane extending at slightly less than ninety degrees to the axis of the bit, so as to provide a cutting edge which will have one portion thereof in advance of the rest of the edge to facilitate entrance into the belt material. Rearwardly of the cutting edge, a portion of the tubular bit is cut out as indicated at 56 to provide an ejector hole for the core which is removed from the belt. When the core is ejected from the bit, the same may be removed from the top side of the lateral extension 12 and any lint may be cleared through the bottom hole 57 therein.

The bit 54 is preferably formed integral with a screw shank 58 threaded in the nut end section 112 of the lateral extension 12. The screw shank 58 is provided at its outer end with a suitable bar handle 59 to facilitate its operation. The boring bit is guided in its horizontal inward and outward movements preferably by an inserted bearing ring 60 seated in the upper casting 10, the adjacent wall of the casting having an aligned opening 61. Also, to prevent injury to the cutting edge of the bit after the same has passed laterally through the belt, the clamping backing block 21 is provided with a suitable annular recess 62 to accommodate the end of the bit, as shown in Figures 3 and 4. In this connection, it is desirable that the inward or advancing movement of the bit be strictly limited within predetermined limits, and for this purpose the bit is provided with a gauge collar 63 rigidly secured thereto. Said collar limits the inward movement of the bit by engagement with the fixed shoulder or wall 64 of the holder A and also limits the outward movement of the bit by engagement with the shoulder or wall 65 as shown in Figure 3.

The final operation on the belt end is preferably that of the cutting or trimming, done by the knife C. The latter is secured at its lower end by machine screw 66 to a rectangular operating bar 67 slidably mounted in a correspondingly shaped recess in the lower casting 11. Said bar 67 is extended to the left-hand side of the holder A, as viewed in Figure 1 and has a suitable hand knob 68 secured thereto to facilitate its operation. The knife C extends vertically upward into a suitable slot 69 in the upper casting 10 and through a corresponding aligned slot in the plate 17. The slot in the plate 17, terminates at 317 to provide a shoulder to limit the outward movement of the knife. The clamping block 21 is also suitably slotted as indicated at 70 to accommodate the knife C in its movements. The upper casting 10 is likewise slotted as indicated at 71 to accommodate the knife at its extreme inward movement.

Referring more particularly to Figures 3, 4 and 5, it will be noted that the path of movement of the knife C intercepts the path of movement of the boring bit B and necessarily so because, in the finished end of the belt as shown in Figure 9, it is essential that the flat trimmed end 41 intersect the recess formed by the bore 39. In order, therefore, that the knife and bit may never foul each other, the operating bar 67 of the knife has its inner end extended as indicated at 75

167 and terminated at such point that said end 167 will engage the collar 63 of the boring bit prior to any possible engagement between the knife proper and the cutting edge of the bit. As will be understood, the paths of movement of the collar 63 and operating bar 67 intercept as will be evident from an inspection of Figure 1.

With the tool as shown and described, it is evident that the punched slit 40, bore 39 and trimmed end 41 of the belt are all accurately located with reference to each other and the various surfaces of the belt end so as to insure the proper location of the fastener when attached to the belt end. In connection with the boring of the belt, it will be noted that the same is fully backed by the clamping backing member 21 directly in line with the bit so as to reduce to an absolute minimum any distortion of the recess formed by the bit.

The device herein shown and described is the one now considered preferable for the purposes indicated, but the same is by way of illustration only and not by way of limitation inasmuch as it is evident that various changes and modifications may be made without departing from the spirit of the invention. All changes and modifications are contemplated that come within the scope of the claims appended hereto.

What is claimed is:—

1. In a device for preparing the end of a belt, the combination with a holder recessed for the reception of the end portion of a V-belt; of means for clamping the belt end portion in the recess; means, carried by the holder, for removing a section of the belt transversely thereof and while clamped; and means, carried by the holder, for cutting off the end of the belt while clamped.

2. In a device for preparing the end of a belt, the combination with a holder recessed for the reception of the end portion of a V-belt; of means for clamping the belt end portion in the recess; means, carried by the holder, for removing a section of the belt transversely thereof and while clamped; means, carried by the holder, for cutting off the end of the belt while clamped, said cutting means and removing means having paths of movement coinciding in part; and cooperable means associated with said cutting and removing means preventing interference in the operation of either by the other.

3. In a device for preparing the end of a belt, the combination with a holder recessed for the reception of the end portion of a V-belt; of means for clamping the belt end portion in the recess; a boring bit movable transversely of and through the belt while clamped; and a cutting knife also movable transversely of the belt and adapted to trim the latter while clamped.

4. In a device for preparing the end of a belt, the combination with a holder for the end portion of a belt; of clamping means for the belt; a belt punch mounted in said holder; belt boring means mounted in said holder; and belt cutting means mounted in the holder, said punch, boring means and cutting means having a predetermined relationship with each other.

5. In a device for preparing the end of a V-belt, the combination with a holder for the end portion of the belt; of means for boring the belt transversely thereof; means, movable transversely of the belt, for cutting off the end thereof in predetermined relationship to the bore; and means for punching the belt radially.

6. In a device of the character described, the combination with a holder for a V-belt end; of means for clamping the belt end in fixed position; a boring bit movably mounted on the holder in a direction transverse of the belt; a knife slidably mounted on the holder to also move transversely of the belt but from the opposite side thereof to that of the boring bit, the line of movement of the knife intercepting the path of movement of the boring bit; and cooperable means for limiting the relative approach of the bit and knife to prevent contact thereof in any position of either.

7. In a device for preparing the end of a belt, the combination with a holder recessed for the reception of the end portion of a V-belt and having a fixed abutment on one side of the recess; an adjustable slidable backing clamp on the opposite side of said recess; a knife slidably mounted on the holder to trim the end of the belt; a boring bit mounted on the holder and movable transversely of the belt toward and from said backing clamp; and means limiting the movement of the boring bit relative to the backing clamp to prevent improper engagement thereof.

8. In a device for preparing the end of a V-belt, the combination with a main support having a recess for the reception of a portion of a V-belt, said recess being defined by a fixed inclined wall and an opposed clamping block having a complementally inclined wall for positioning the belt in clamped position; means mounted on the support for removing a section of the belt transversely thereof while clamped; means for cutting off the end of the belt while clamped; and means for punching the belt radially, said means being located inwardly of said section-removing means.

9. In a device for preparing the end of a V-belt, the combination with a main holder having a recess for the reception of the V-belt, said recess being defined by a fixed inclined wall and a clamping backing block adjustable toward and from the fixed wall; of a boring bit operable in a path extending transversely of the belt and in line with the backing block; a knife slidably mounted on the holder and movable transversely of the belt and normally positioned on the opposite side thereof to that of the boring bit, the path of movement of the knife intercepting the path of movement of the bit; means preventing contact of the knife with the boring bit; and a punch adjustably mounted on the holder to move in a direction transverse to the paths of movement of the bit and knife.

10. In a device for preparing the end of a belt, the combination with a holder recessed for the reception of the end portion of a V-belt, the recess being defined, in part, by two converging walls corresponding to the converging sides of the V-belt, said walls being relatively adjustable toward and from each other to thereby clamp the V-belt therebetween; means mounted on the holder for trimming the end of the belt; and means, also carried by the holder, for removing a section of the belt transversely thereof from side to side and while clamped between the said recess side walls.

JOHN C. OLSEN.